May 1, 1962  J. MÜLLER  3,032,640
WELDING TEST DEVICE
Filed April 26, 1961
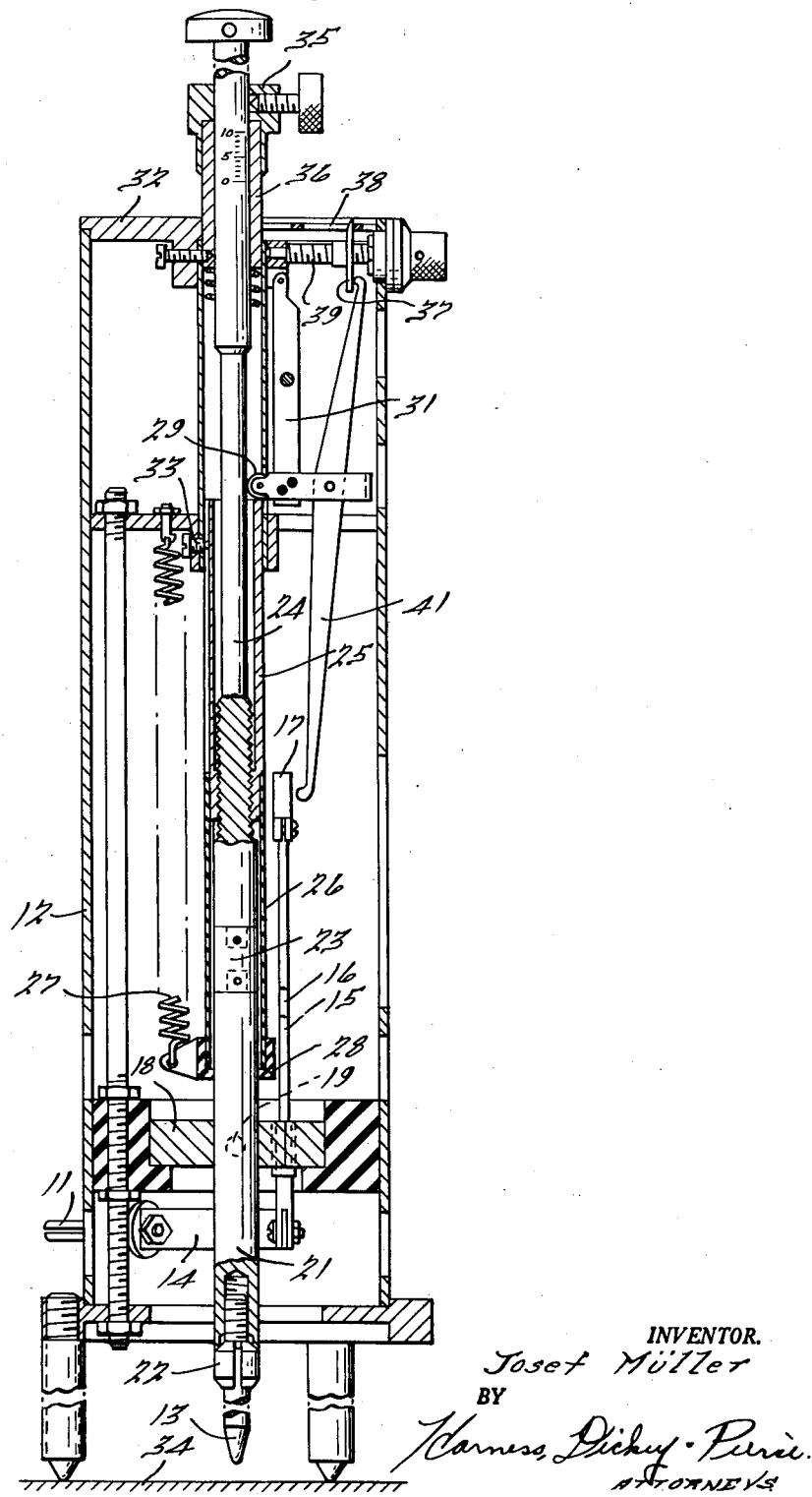
INVENTOR.
Josef Müller
BY
Harness, Dickey · Pierce
ATTORNEYS

United States Patent Office 3,032,640
Patented May 1, 1962

3,032,640
WELDING TEST DEVICE
Josef Müller, Spechbach, Landkreis Heidelberg, Germany, assignor to Hans A. Sickinger, Bloomfield Hills, Mich.
Filed Apr. 26, 1961, Ser. No. 105,633
Claims priority, application Germany May 3, 1960
5 Claims. (Cl. 219—136)

This invention relates to welding test devices, and more particularly to devices for testing metallic construction materials as to their weldability and degree of purity by means of local fusion tests with tungsten or carbon arcs.

It has been established in previous reports dealing with metallurgical problems and welding techniques that the weldability or breaking strength of metallic construction materials, particularly as regards their welding brittleness, depends upon their degree of purity. This theory has been confirmed particularly with regard to the risk of cold shortness as well as hot shortness of welded building components using structural steel.

The technical and economic drawbacks of known testing methods for determining weldability, such as the notch impact test method, are quite evident; it cannot be established during the welding operation by means of the latter method whether and to what extent a given steel is embrittled by a certain welding technique, nor what specific measures may be taken to diminish the welding embrittlement until a breaking strength of the welded steel is obtained which may be expressed in figures.

It is an object of the invention to provide a weldability test and device therefor which overcomes the limitations and drawbacks of previously known testing means and provides a manner of determining the above described factors.

A fusion tester developed in 1953 consists of an electrode holder and a current transformer that serve to effect the ignition and to limit the burning period of the electric arc following each ignition to a constant time. Such a current transformer must thus be a special appliance and not a normal welding appliance, and if the electrode holder were to be used in conjunction with a conventional welding machine, it would be unserviceable for weldability tests.

The constant burning period of the electric arc in the 1953 appliance with varying current intensities furthermore does not meet practical welding conditions. In practice, for example, if the welding current intensity is doubled, the electric arc remains on the same length of welding path for only half the time, thus resulting in a different cooling period. The operation of the 1953 appliance would therefore not correspond to the actual welding operation, making it unsatisfactory.

It is another object of the invention to overcome this drawback of the 1953 welding tester and to provide a device which will automatically vary the time of the fusion test in accordance with the intensity of the welding current.

It is a further object of the present invention to provide an improved welding tester which can be used in conjunction with generally available welding machines, thus dispensing with the need for a relatively expensive special appliance.

Other objects, features, and advantages of the present invention will become apparent from the subsequent description, taken in conjunction with the accompanying drawing.

In the drawing:
The FIGURE is a partially schematic cross-sectional view in elevation of a preferred embodiment of the welding test device.

In general terms, the illustrated embodiment of the welding test device comprises a housing having a plurality of downwardly extending legs engageable with a steel workpiece on which it is desired to perform the test. The housing supports a vertically movable electrode holder carrying an electrode, and means are provided for urging the electrode holder upwardly from a lowered position in which the electrode engages the workpiece. A detent is provided for limiting the upward movement of the electrode holder, the length of the holder being vertically adjustable so that the distance of the electrode tip from the work in the detained position may be exactly determined. The current flowing to the electrode passes through a bimetal which, upon being heated, causes withdrawal of the detent, thus permitting the electrode to be quickly pulled upwardly a sufficient distance to extinguish the arc. The detent withdrawal is accomplished through a lever actuated by the bimetal, and the fulcrum position of this lever may be preadjusted in accordance with requirements to vary the time of arc before the detent is retracted. By fusing a plurality of welding points on the steel workpiece by the use of this device, using various settings of electrode distance and time of arc, the degree of steel embrittlement in the welding process can be determined after the fusions have cooled.

Referring more particularly to the drawing, voltage and current of the connected welding machine enter the appliance through the plug pin 11 which is insulatively supported by the housing tube 12, and are conveyed to the electrode 13, consisting of solid carbon or tungsten, by passing first through a copper strip 14, then through a strip 15 which is one of two thermobimetal strips 15 and 16 and which is insulatively supported or clamped at its lower end, then through the copper bridge 17 and into the second bimetal strip 16, into the copper disc 18 to which 16 is conductively clamped, through carbon brush 19 mounted in the copper disc 18 and to the copper pin or electrode holder 21 and through the collet 22 to the electrode 13, as mentioned above.

Copper pin 21 is firmly connected at its upper end by means of an insulating cylinder 23 with an adjusting spindle 24, the latter being vertically supported by means of a thread of 1 mm. pitch on the spindle and a steel sleeve or electrode holder support 25 provided with a similar thread and threadably engaging the adjusting spindle 24. To the lower end of the steel sleeve 25 an insulative tube 26 is fastened which is subjected to a constant upward pull by one or more tension springs 27 connected to tube 26 by a spring holder 28 made of insulative material.

If the adjusting spindle 24 together with electrode 13 are pushed downwardly against the spring tension until arrested by a stop pawl in the form of a roller 29, the appliance is tensioned and ready for its operation.

Roller 29 is pivoted on a lever 31 which in turn is pivoted at its upper end to a steel sleeve which forms part of an upper housing cover 32.

The adjusting spindle 24 can together with electrode 13 be rotated on its own axis so as to be adjusted upwardly or downwardly, as the threaded sleeve 25 is prevented from rotation by longitudinal slot and stud pin 33.

In operation, after the metal 34 to be tested has been placed under the unit, the length of the electric arc is set in proportion to the current intensity and from the contact position of the two poles. An adjustable collet 35 and a millimeter scale which is firmly attached to a sleeve 36 and housing 12, 32 jointly produce a micrometer effect on the adjusting spindle 24, and by rotating this spindle within threaded sleeve 25, the vertical position of electrode 13 with respect to sleeve 25 may be adjusted.

The burning period of the electric arc is predetermined by adjustment of a lever stop 37 in that after zero adjustment of a slidable ampere scale 38 the lever stop 37 is set—subject to the bimetal temperature—to the desired current intensity, which can be done again with micrometer accuracy. For this purpose, stop 37 is threadably mounted on an adjusting screw 39.

If the electric arc is then ignited by means of a brief downward pressure on the electrode spindle 24 and therefore electrode 13—which pressure is permissible only until contact is established with the anti-poled test metal—the present length of arc is obtained after the spindle is released and is automatically arrested by roller 29. The bimetals are now bent by the effect of the current and as soon as the upper end of a lever 41 (engaged at its lower end by the copper bridge 17) finds a counter-bearing on lever stop 37 the bimetals—according to the adjustment of current intensity—will pivot lever 31 and withdraw roller 29 from its latching position, thus releasing the electrode holder support from its arrested condition and withdrawing the electrode through the action of springs 27 a distance of 45 mm. from the test metal, thereby extinguishing the electric arc.

The adjusted burning periods of the electric arc will be inversely proportional to the current intensity, as in the case of normal welding in straight lines.

With the aid of the solidified fusion of the test metal it can be determined whether this will embrittle under the heating-up and cooling-down conditions applied, i.e., whether it will form cracks or not. Accordingly, the overheated zones adjoining the fusion zone will be either undeformable or still deformable, depending upon the continuously decreasing embrittlement effect, even in welding operations carried out with equal characteristic quantities irrespective of the filler steel employed, the latter not affecting the overheated zones materially.

If the welding operation is performed in a weaving pattern rather than straight lines, the mean current density over the width of seam becomes smaller in relation to the widths of seam, which can be easily taken into account in evaluating the fusion results.

Through variation of the other welding or heating influences, of the current intensity and the temperature condition of the steel during testing and welding, the critical welding conditions, i.e. the point where embrittlement begins to set in, can be determined for any steel, and thereby also the specific welding conditions required to identify the breaking strength with regard to welding brittleness, provided that these welding conditions are sufficiently economical or practicable for a given type of steel. The embrittlement-critical fusion temperatures of steel with normal current intensity are, in accordance with their low value, numerical criteria of the weldability of that particular steel.

Just as the quality of the weld can be improved with the aid of the present appliance, so can the economy of a welding operation. The susceptibility of a given steel to the formation of blowholes can also be determined by the fusion test. As such blemishes are largely caused by the same excitants in the steel as welding embrittlement, very much like excessively high welding hardness, welding stresses, and distortions which are affected by the heating and cooling rate or by a limited dissolving power in Fe, these negative welding effects can also be diminished.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a device for testing metallic construction materials as to their weldability and degree of purity by means of local fusion tests with tungsten or carbon arcs, a vertically extending support having means at its lower end engageable with a workpiece surface, an electrode holder mounted for vertical movement on said support between a first position in which an electrode carried by the lower end of said holder engages said workpiece, a second position above said first position in which said electrode is a sufficient distance from said workpiece to extinguish an arc therebetween, and a third position between said first and second positions, resilient means urging said electrode holder upwardly, a stop for limiting the upward movement of said electrode holder to define said second position, said stop being movable between a latching position and a retracted position, a terminal carried by said support and connectible to a welding machine, a current-conductive path between said terminal and said electrode holding means, a bimetal in series with said current-conductive path, and means responsive to current passing through said bimetal for causing said stop to be moved from its latching position to its retracted position.

2. The combination according to claim 1, further provided with an electrode holder support engageable with said stop, and means for vertically adjusting the position of said electrode holder with respect to said support.

3. The combination according to claim 2, said electrode holder support comprising a tubular element having an internally threaded portion, said electrode holder being threadably mounted in said threaded portion, and a rotatable spindle extending upwardly from said electrode holder through said support.

4. The combination according to claim 1, said last-mentioned means comprising a lever connected to said stop and having a portion engageable by said bimetal, a fulcrum for said lever, and means for selectively adjusting the position of said fulcrum.

5. The combination according to claim 4, said electrode holder support comprising a tubular element, said detent being engageable with the upper edge of said element to limit upward movement thereof, and means for selectively adjusting the relative vertical positions of said electrode holder and said electrode holder support.

References Cited in the file of this patent

UNITED STATES PATENTS 2,769,893     Muller _____ Nov. 6, 1956